Sept. 1, 1959  F. J. WINCHELL  2,902,126
ONE WAY CLUTCH
Filed Aug. 3, 1956

INVENTOR.
Frank J. Winchell
BY
W. C. Middleton
ATTORNEY

United States Patent Office 2,902,126
Patented Sept. 1, 1959

2,902,126

ONE WAY CLUTCH

Frank J. Winchell, Franklin Village, Mich., assignor to General Motors Corporation, Detroit, Mich., a corporation of Delaware Application August 3, 1956, Serial No. 601,937

7 Claims. (Cl. 192—45.1)

This invention relates to a one-way clutch and more particularly to the type of clutch having a series of wedging devices operating between race surfaces.

It is essential in this type clutch that the wedging devices always be properly aligned during operation so that each shares its proportionate share of the load. Otherwise the clutch will malfunction with resultant breakage or damage to the wedges as well as the race surfaces.

To overcome this alignment problem, the present invention seeks to provide a clutch structure that ensures against such misalignment or cocking of the wedging devices. Specifically, the invention contemplates a cage coacting with unique biasing means for positioning the wedging devices so that their axes are maintained substantially parallel with the rotational axis of the clutch unit. As a further preventive of misalignment from quick reversals, frictional means for carrying the outer race with the cage during unlocked idle rotation is furnished.

In addition to the alignment problem, it is essential that each wedging device share the load. If one or more fail to do this or are tardy in assuming the wedging position, then the active wedges are over stressed causing breakage or the wedges turn over and can no longer operate. For this uniform loading the wedging devices must be in contact with both clutch races prepared for rapid movement to the wedging position. Although production tolerances are an important factor, it is preferable not to increase the costs of the clutch unit by lowering the permissible tolerances. Also, an energizing spring aids but does not solve this problem.

This invention seeks to provide a clutch of the one-way type employing wedging devices that by construction and arrangement inherently contact both race surfaces by relying upon rotational forces.

Another consideration in clutches with a plurality of wedging devices is installation, i.e., each wedging device must be disposed between concentric clutch races. If each wedge is inserted individually, obviously considerable time is consumed as well as the possibility of installing the wedges improperly, e.g., backwards. If the wedges are inserted as a group, there is always concern that one of the wedges will be dropped.

This invention advantageously utilizes the aforementioned cage as a support for the individual wedges so that together with a conventional energizing spring, the wedges are retained within the cage and cannot escape at anytime during installation. The cage supports do not interfere with operation since the wedges are separated from the supports when they are properly positioned between the races.

The foregoing and other objects and advantages of the invention will be apparent from the following description and from the following drawings, in which.

Figure 1:
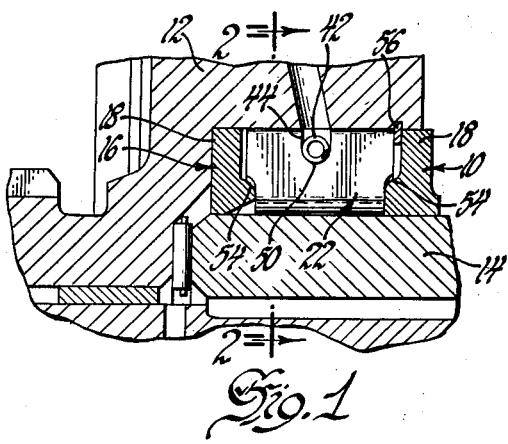
Figure 1 is a sectional view of a one-way clutch depicting the clutch assembly between concentric recesses.

In Figure 1, an embodiment of the invention is depicted as a clutch unit with a one-way clutch assembly 10 positioned between substantially concentric first and second ring members, e.g., outer race 12 and inner race 14.

Figure 2:
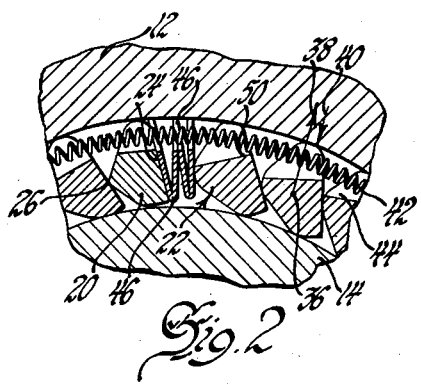
Figure 2 is a section along line 2—2 of Figure 1.

A cage 16, a part of the clutch assembly 10, has spaced side rings 18 joined by integral cross-ribs 20 spaced about the rings to define windows in which one-way clutch elements or wedging devices such as sprags 22 are assembled. As demonstrated in Figure 2, these cross-ribs 20 are of substantially the same cross sectional configuration as the sprags 22, somewhat of a D-shape, with a generally flat rear side 24 and a rounded front side 26 and having an axis parallel with the rotational axis of the clutch unit. Preferably, a relatively close fit is provided between the internal and external diameters of the side rings 18 and the corresponding diameters on the two races 12 and 14 so that the cage functions as a bearing support.

Figure 4:
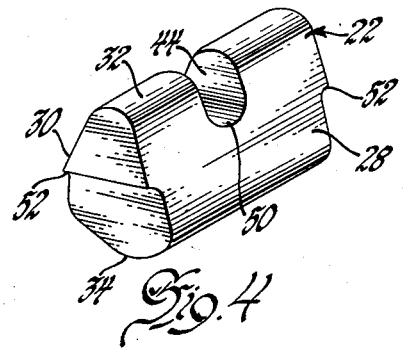
Figure 4 is a perspective of a sprag or wedging device of the one-way clutch.

Each of the sprags 22, see Figure 4, includes a relatively flat face 28 and an opposite face with an extension 30, the faces together forming the aforementioned D-shape. An outer cylindrical surface 32 and inner cylindrical surface 34 on each sprag bear respectively against the outer and inner races 12 and 14. This configuration is such that the mass of the sprag is concentrated at a center of gravity represented by the point 36 in Figure 2. Consequently, when the clutch assembly is rotated, the mass tends to move outwardly in the direction of arrow 38. Since the supporting force of the outer race 12 occurs at the point of contact, point of arrow 40, between the sprag and the race 12, a turning moment due to the clutch rotation constantly urges the sprag clockwise about the point of the arrow 40 into contact with the inner race 14. Hence, the desirable feature of having each sprag in constant engagement with both inner and outer races for uniform loading is assured in a positive manner regardless of the speed of rotation of the races. To supplement this action, an encircling garter spring 42, received by notches as at 44, biases the sprags towards the wedging position, i.e., into contact with both races.

Figure 3:
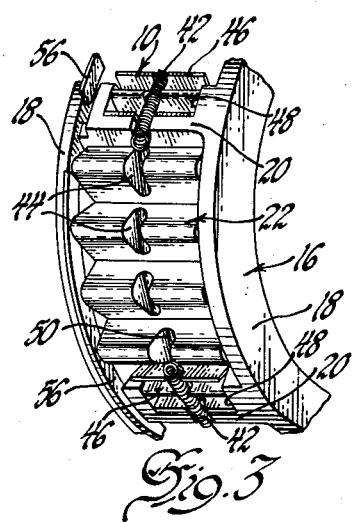
Figure 3 is a perspective of a portion of the one-way clutch.

Although a lesser or greater number of sprags may be desired, four sprags are shown by Figure 3 assembled in each window of the cage 16, i.e., the space between cross-ribs 20, with all of the sprags urged against one of the cross-ribs 20 by an alignment spring 46 of the folding or accordion type. As demonstrated by Figures 2 and 3, the accordion spring 46 is housed in a recess 48 in one side of the cross-rib 20. The recess and spring are of narrower width than the sprags and the recess is of a predetermined depth to insure against compressing the spring to solid height. However, the spring width is only slightly reduced to still extend across the maximum length of the sprag and to resiliently urge the flat face 28 of each sprag into contact with the extension 30 of the preceding sprag. The last sprag of the series of four abuts the rounded front side 26 of the cross-rib 20 so that all of the sprags are resiliently held parallel to the axis of the cross-ribs 20. Therefore, the sprags are kept in proper alignment relative to the clutch rotational axis and further are prevented from cocking, reducing possible breakage. Also chances of misalignment occurring when the garter spring 42 catches on the back edge 50 of the notch 44 of the sprags is lessened since the notch 44 in the accordion spring 46 performs as a guide to prevent this. It has been found from tests that the spring 46 operates best in the Figure 2 position. If reversed, the loose ends of the spring catch between the inner race 14 and the sprag surface 34.

To aid in installation of the clutch assembly 10, the sprags are relieved on each end to provide shoulders 52 adapted to be supported by ledges 54 on the side rings 18. With the garter spring 42 performing its energizing function of biasing the sprags towards the wedging position, the sprag shoulders 52 will snugly abut the cage ledges 54 until the clutch assembly 10 is inserted between the races. When between the races, the sprags move to the position in Figure 1 separating the shoulders 52 from the ledges 54 so that there will be no unnecessary friction losses during operation.

The clutch assembly 10 is restrained from axial movement relative to the outer race 12 by a snap ring 56 having a slight frictional engagement with a relieved portion of the cage 16. The purpose of this frictional engagement can best be explained by assuming a period of operation during which the inner race 14 is rotating rapidly clockwise while the outer race 12 is held and the cage 16 is rotating clockwise free from either race. If the inner race 14 is suddenly reversed, the momentum from free rotation of the cage will cause the cage to attempt to continue in clockwise direction, hence creating unnecessary strains. When the cage is restrained from rotation except with the outer race 12, this cannot occur during normal operation.

I claim:

1. A one-way clutch assembly adapted for installation between a pair of relatively rotatable races comprising a circumferential series of adjacent wedging devices, a cage having windows for receiving and positioning said wedging devices, cross-ribs on said cage defining said windows and engageable with said wedging devices, accordion-shaped alignment means biasing said wedging members into engagement with said cross-ribs for maintaining the axes of said wedging members and the axis of said cage parallel, and resilient means encircling said assembly to impart wedging movement of said wedging devices relative to said races, said cage and said wedging devices having interengageable arcuate surfaces at the sides of said windows and coacting with said resilient means to retain said wedging devices in unit-handling relation with said cage during installation of said assembly between said races.

2. A one-way clutch assembly adapted for installation between a pair of relatively rotatable races comprising a series of wedging devices, a cage having windows for receiving and positioning said wedging devices, cross-ribs on said cage defining said windows and engageable with said wedging devices, each of said wedging devices being adapted both to pivot about a line of contact with one of said races and to have its center of mass located outside of a plane determined by the axis of said races and said line of contact and on such side of said plane that forces due to revolution of the wedging devices about said race axes will urge the wedging devices to rotate about the line of contact and into contact with the other of said races, said cross-ribs having an axis parallel to the said race axes and of substantially the same cross-sectional configuration as said wedging devices, and a spring disposed within each of said windows for urging said wedging devices against an adjacent cross-rib to maintain parallel alignment between the wedging devices and said cross-rib.

3. A one-way clutch assembly for installation between a pair of relatively rotatable races comprising a series of wedging devices, a cage having windows for receiving and positioning said wedging devices, cross-ribs on said cage defining said windows and engageable with said wedging devices, a rounded projection on each cross rib pivotally receiving one of the wedging devices thereagainst, an alignment spring disposed within each of said windows and resiliently engaging a cross-rib, said spring urging said wedging devices against adjacent cross-ribs and maintaining parallel alignment between the axes of each wedging device and each cross-rib, and resilient means encircling and engaging the cage and wedging devices and alignment springs to impart wedging movement of said wedging devices relative to said races, said alignment springs serving as a guide for said resilient means to prevent its interference with the action of said wedging devices.

4. A one-way clutch assembly adapted for installation between a pair of relatively rotatable races comprising a series of wedging devices, a cage having windows for receiving and positioning said wedging devices, cross-ribs on said cage defining said windows and engageable with said wedging devices, the cross-ribs having an axis parallel to the cage axis, an alignment spring disposed within each of said windows for urging said wedging devices against an adjacent cross-rib to maintain parallel alignment between the axes of said wedging device and said cross-rib, and resilient means encircling said assembly to impart wedging movement to said wedging devices relative to said races, said cage having a recess for receiving said spring and preventing said spring from being compressed to solid height.

5. A one-way clutch assembly adapted for installation between a pair of relatively rotatable races comprising a series of wedging devices, a cage having windows for receiving and positioning said wedging devices, cross-ribs on said cage defining said windows, one side of each cross-rib having divergent faces engageable with one of said wedging devices to provide for tiltable movement of the wedging device thereagainst, the other side of each cross-rib having a flat face, and a folding spring disposed within a recessed portion of each of said windows and in engagement with one of said flat rib faces for urging each of said wedging devices against an adjacent cross-rib to maintain parallel alignment between the axes of said wedging device and said cross-rib, and having the open ends of said spring facing outwardly to avoid interference with the action between the wedging device and one of said races at a contact point nearest the race axes.

6. A one-way clutch assembly adapted for installation between a pair of relatively rotatable races comprising a series of wedging devices being constructed and arranged to hold themselves in contact with both of said races by forces due to revolution of said wedging devices about axes of the races, a cage for positioning said wedging devices and including spaced side rings with interconnecting cross-ribs parallel to the cage axis, said cross-ribs having substantially the same cross-sectional configuration as said wedging devices, an alignment spring for urging said wedging devices against an adjacent cross-rib to maintain parallel alignment between axes of said wedging device and said cross-rib, and resilient means encircling said assembly to impart wedging movement of said wedging devices relative to said races, said alignment spring being adapted to function as a guide for said resilient means for preventing interference with the action of said wedging devices, said cage and said wedging devices having surfaces coacting with said resilient means to retain said wedging devices in said cage during installation of said assembly between said races.

7. A one-way clutch assembly adapted for installation between a pair of relatively rotatable races comprising a series of wedging devices having a substantially flat side and a curved side to provide a D-shaped configuration, a cage for positioning said wedging devices and including spaced side rings with interconnecting cross-ribs parallel to the cage axis, said cross-ribs having substantially the same cross-sectional shape as said wedging devices including a flat side and an opposite curved side, said flat side of said wedging device engaging said curved side of said cross-rib, a spring disposed to act between a recess in the flat side of said cross-rib and the curved side of said wedging device to constantly bias said wedging devices into parallel alignment with said cross-rib.

References Cited in the file of this patent

UNITED STATES PATENTS

| | | |
|---|---|---|
| 2,360,481 | Dodge | Oct. 17, 1944 |
| 2,428,962 | Davis | Oct. 14, 1947 |
| 2,597,241 | Gruenberg et al. | May 20, 1952 |
| 2,630,896 | Dodge | Mar. 10, 1953 |
| 2,705,066 | Szady | Mar. 29, 1955 |
| 2,748,912 | Banker | June 5, 1956 |
| 2,806,566 | Szady et al. | Sept. 17, 1957 |